United States Patent [19]

Risley et al.

[11] Patent Number: 5,605,217

[45] Date of Patent: *Feb. 25, 1997

[54] VACUUM COMBINER AND VACUUM CONVEYOR

[75] Inventors: Robert F. Risley, Ellicott City; Paul E. Barkely, Sykesville; Gordon S. Lawless, Finksburg, all of Md.

[73] Assignee: Ambec, Owings Mills, Md.

[*] Notice: The term of this patent shall not extend beyond the expiration date of Pat. No. 5,311,979.

[21] Appl. No.: 412,708

[22] Filed: Mar. 29, 1995

Related U.S. Application Data

[63] Continuation-in-part of Ser. No. 242,776, May 16, 1994, abandoned, which is a continuation of Ser. No. 10,770, Jan. 29, 1993, Pat. No. 5,311,979.

[51] Int. Cl.⁶ .................................................. B65G 47/12
[52] U.S. Cl. .......................... 198/453; 198/454; 198/493; 198/836.1; 198/689.1
[58] Field of Search ...................... 198/453, 454, 198/493, 689.1, 803.5

[56] References Cited

U.S. PATENT DOCUMENTS

| | | | |
|---|---|---|---|
| 2,800,226 | 7/1957 | Drennan | 209/111 |
| 2,827,998 | 3/1958 | Breeback | 198/31 |
| 2,860,761 | 11/1958 | Kocan et al. | 198/26 |
| 3,352,404 | 11/1967 | Di Settembrini | 198/689.1 |
| 3,854,567 | 12/1974 | Poupin et al. | 198/689.1 |
| 3,934,706 | 1/1976 | Tice | 198/32 |
| 4,236,625 | 12/1980 | Smith et al. | 198/454 |
| 4,284,370 | 8/1981 | Danler et al. | 406/86 |
| 4,479,574 | 10/1984 | Julius et al. | 198/836.1 |
| 4,522,295 | 6/1985 | Seragnoli | 198/493 |
| 4,620,826 | 11/1986 | Rubio et al. | 414/73 |
| 4,669,604 | 6/1987 | Lenhart | 198/453 |
| 4,670,935 | 6/1987 | Bowler | 198/689.1 |
| 4,744,702 | 5/1988 | Wiseman et al. | 406/88 |
| 4,768,643 | 9/1988 | Lenhart | 198/453 |
| 4,822,214 | 4/1989 | Aidlin et al. | 406/86 |
| 4,962,843 | 10/1990 | Ouellette | 198/453 |
| 4,976,343 | 12/1990 | Fuller | 198/453 |
| 5,009,550 | 4/1991 | Hibish et al. | 406/87 |
| 5,017,052 | 5/1991 | Bartylla | 406/88 |
| 5,028,174 | 7/1991 | Karass | 406/88 |
| 5,037,244 | 8/1991 | Newton | 406/86 |
| 5,037,245 | 8/1991 | Smith | 406/88 |
| 5,042,639 | 8/1991 | Guinn et al. | 198/454 |
| 5,065,858 | 11/1991 | Akam et al. | 198/493 |
| 5,129,504 | 7/1992 | Smith | 198/453 |
| 5,160,014 | 11/1992 | Khalar | 198/453 |
| 5,170,881 | 12/1992 | Willison | 198/689.1 |
| 5,234,097 | 8/1993 | Okuyama | 198/689.1 |
| 5,311,979 | 5/1994 | Risley et al. | 198/454 |

*Primary Examiner*—Joseph E. Valenza
*Attorney, Agent, or Firm*—Thomas, Kayden, Horstemeyer & Risley

[57] ABSTRACT

The invention provides both a vacuum combiner and vacuum conveyor for combining a plurality of lightweight containers arranged in a random order and width into a single row of containers, and moving the containers on a conveyor line to downstream workstations at high speed rates. The vacuum combiner includes one or more conveyor belt-type surfaces, while the vacuum conveyor has a single belt-type surface, all of which have openings defined therein. Both devices also have at least two guide rail assemblies, and a vacuum source that adds a "drag" or "weighing" force on the light-weight containers moved thereon. The conveyor belt-type surfaces of the combiner and the conveyor may or may not be moving at the same velocity. The guide rail assemblies are each comprised of a plurality of rods and rollers, wherein the rollers are aligned in a unique anti-jamming staggered or diamond pattern. The guide rail assemblies are positioned such that they are either substantially upright, or are positioned such that each is inclined over and above the conveyor surfaces. The rods within the guide rail assemblies may be substantially vertical, or they may be inclined forward. One vacuum source may be used for the plurality of conveyor surfaces, or one vacuum source may be used for each individual conveyor. The vacuum force should be such that it is greatest on the discharge conveyor surface and lowest on the infeed conveyor surface. In an alternative embodiment, the level of vacuum applied to the conveyor surfaces increases along the length of each conveyor surface.

12 Claims, 9 Drawing Sheets

VACUUM COMBINER AND VACUUM CONVEYOR

CROSS REFERENCE TO RELATED APPLICATIONS

This is a continuation-in-part of application Ser. No. 08/242,776 filed on May 16, 1994, now abandoned which was a continuation of application Ser. No. 08/010,770, now U.S. Pat. No. 5,311,979, filed on Jan. 29, 1993.

FIELD OF THE INVENTION

This invention is drawn to a means and method for the high speed conveyance of lightweight containers such as cans and plastic bottles oriented in a generally upright attitude on a surface conveyor system. In particular, the invention relates to a vacuum surface conveyor combiner that rapidly merges lightweight containers from an upstream width of at least three containers abreast to a downstream width of one container so that the containers are combined into a single file, and a vacuum surface discharge conveyor for moving the containers from the combiner toward a subsequent processing station.

BACKGROUND OF THE INVENTION

Industries that package their products in can or bottle-type containers are constantly searching for ways to maximize production output. With the ever-increasing demand for higher production rates, surface conveyor systems have been designed which are capable of accumulating a large number of containers so that the surface conveyor can accommodate a varying backlog of the containers. For example, the infeed of the conveyor system might be several times wider than the containers so as to be able to receive the containers in random multiple width arrangements of containers. Usually, the wider the infeed conveyor, the greater its accumulation capability will be. Hence, several container-dependent industries now use relatively wide conveyor systems.

Although wider conveyor systems have helped to increase production rates, production rates still are limited because the typical production line requires that containers be fed into a subsequent work station in a single file moved along a conveyor line. For example, standard equipment such as inspection lights and/or electronic bottle inspectors, product fillers, container cappers or sealers, container de-cappers, and labelers all require that the containers must enter in a single file. In order to narrow the container stream width from an initial multiple width of containers to single file, combiners have been developed. The smooth transfer of containers from a wide conveyor surface to single file width makes the combiner one of today's more important items in bottling production lines. Similarly, once the containers have been combined, they must be moved as quickly and as efficiently as possible from the combiner to, and between, subsequent workstations.

In the past, multiple flat top chain conveyors and converging rails have been used in order to combine containers from a mass of containers into a single file or row of containers. When combining lightweight containers the problem arises in that the side-to-side compaction of the containers against one another causes some of the containers to be lifted above the conveyor belt sorter by adjacent bottles and to thus lose speed because the lifted bottles no longer ride on the conveyor chain. This side-to-side compaction also creates a problem where the containers bridge against and between the side rail guides of the combiner so that the movement of the containers stalls while following containers push the containers next ahead, which tends to cause more bridging between the side rails instead of pulling the containers in spaced relationship into single file.

Also, in the past it was generally believed in the industry that glass bottle combiners must be designed to satisfy the following conditions: (1) the combiner must be at least two meters long; (2) the downstream end of the combiner must be located at least two meters upstream from the equipment it feeds; (3) the combiner must use tapered guide rails; (4) the combiner should use two chains—a 7½ inch width feed chain and a 3¼ inch width single discharge conveyor chain; (5) the relation of the infeed chain speed to the discharge chain speed must be 66%; and (6) the combiner must always be full of bottles to maintain the bottle position that produces smooth flow. A combiner made within these six specifications typically yields an output of 600 to 1000 bottles per minute ("bpm") using standard 12 oz. glass bottles; 1500 cans per minute; and no more than 600 bpm for standard 12 oz. plastic bottles. Twelve ounce plastic bottles are limited to 600 bpm due to their light weight, low bottle stability, high bottle compressibility, and the high degree of friction that exists between the plastic bottles and the guide rails.

If the above six combiner specifications are used with an air-jet guide rail to combine lightweight containers, such as 12 oz. plastic bottles, combiner rates of 650 bpm have been achieved. However, heretofore no one has been able to successfully combine lightweight containers at rates greater than 700 bpm. Existing conveyor lines, and in particular discharge conveyor lines, have been designed and constructed to accommodate these production rates. However, existing conveyor lines will have difficulty in handling the greater production rates realized by this invention.

For metal type containers, such as cans, Lenhart, U.S. Pat. No. 4,669,604, teaches that if objects are first arranged in an equilateral triangle on a dead plate, the objects, such as metal cans, may be formed in a single file using a vacuum source drawn through openings in the conveyor belt to hold the outside row of containers in place on the moving belt and out of engagement with the side rails while the other containers are urged in between the containers in the outside row. However, Lenhart's invention will not work properly if the containers are delivered to it in a "random, helter-skelter fashion," or if the outermost containers on the conveyor belt are not held in a fixed position thereon, and also requires that the cans must be pushed off the dead plate by the oncoming moving mass of cans upstream of the dead plate.

SUMMARY OF THE INVENTION

The invention is a means and method for rapidly combining lightweight containers from an upstream width of three or more containers abreast to a downstream "combined" single container width, and a discharge conveyor for moving the "combined" or a single file row of containers away from the combiner to, and between, downstream workstations along a bottling production line.

The combiner incorporates the use of a plurality of parallel conveyors, preferably three or more, each having at least 10% of its surface area open. Each conveyor is operated in sequence at a greater relative velocity than the previous conveyor, and is in communication with a vacuum source positioned below the conveyor surfaces such that the vacuum source pulls air through the open areas in the conveyor surfaces. The amount of vacuum, or drag force, on each conveyor surface is not necessarily the same. In fact, in alternate embodiments, the vacuum is greatest at the faster moving discharge conveyor surface and lowest at the slower moving infeed conveyor surface, and the level of vacuum may also be increased from the intake end to the delivery end of each conveyor along the length of the conveyor in the direction of its movement. The velocity of each individual container on each conveyor is determined by the velocity of each conveyor surface and by the amount of vacuum applied to each conveyor surface.

The discharge conveyor includes an elongated surface conveyor supported on a framework, the framework also supporting an air plenum thereon, the plenum being in sealed fluid communication with a plurality of air flow openings defined in the surface of the discharge conveyor and along its longitudinal axis. The discharge conveyor also has a drive means, and a guide means for the lightweight containers moved on the conveyor, as well as a vacuum source to pull air through the air flow openings and into the plenum beneath the surface of the discharge conveyor. Also, and as with the combiner, the level of vacuum may be increased from the intake end to the delivery end of the conveyor along its length in the direction of its movement.

Thus, the present invention is ideally suited to convey lightweight containers, such as plastic bottles, that weigh less than or up to six ounces. In the past, a problem with lightweight containers was that they had a tendency to levitate and lose contact with the conveyor surface when they were conveyed at high speeds. When lightweight containers lose contact with the conveyor surfaces, the conveyor surfaces lose control of the movement of the containers, and the containers may engage following containers and/or become wedged or "bridged" against the side rail guides or the conveyor line.

The present invention compensates for this problem by inducing an air flow downwardly through the openings of the conveyor belts of the combiner and the discharge conveyor that develops enough drag or negative air pressure beneath the containers so that the atmosphere pushes downwardly on the lightweight containers to effectively add more weight to the lightweight containers and thereby increase the friction between the bottoms of the containers and the conveyor belts, which effectively increases the velocity at which the containers may be combined and moved. It should therefore be appreciated that lightweight containers having a weight of six ounces can be rapidly combined and moved between workstations by the present invention at speeds heretofore not achieved.

It is thus an object of the present invention to provide a vacuum combiner that rapidly combines lightweight containers, such as plastic bottles, from a width of three or more rows of containers on a surface conveyor system into a single width row.

An additional object of the present invention is to provide a vacuum combiner that avoids the need for an upstream pushing force that pushes the containers downstream.

Another object of the invention is to provide a vacuum combiner, and a vacuum discharge conveyor, each with a guide rail assembly that applies a minimum amount of surface friction to the containers as the containers are combined into a single row and moved away from the combiner toward subsequent workstations.

It is also an object of the present invention to provide a vacuum combiner comprised of three or more conveyor sections, and a vacuum source that provides a vacuum force on each conveyor section, such that the vacuum strength on the conveyor section at discharge is greatest, and the vacuum strength on the conveyor section at the infeed is lowest, to provide a downstream pulling force on lightweight containers.

Yet another object of the present invention is to provide an improved vacuum discharge conveyor adapted to receive lightweight containers, and to move the containers away from the improved combiner of this invention.

Still another object of the present invention is to provide a vacuum combiner having three or more conveyor sections, with each conveyor section having its own vacuum source, such that the vacuum strength on the conveyor section at discharge is greatest, and the vacuum strength on the conveyor section at the infeed is lowest; such arrangement providing a progressively increasing friction force applied by the lightweight containers against the conveyor sections.

It is a further object of the present invention to provide a vacuum combiner including a plurality of individual conveyors, and a vacuum discharge conveyor, having surfaces that operate at velocities different from each other for moving bottles through the combiner and onto the discharge conveyor and away from the combiner.

An additional object of the invention is to provide a vacuum combiner and vacuum discharge conveyor which are simple in design and operation, are inexpensive to construct, and are durable and rugged in structure.

These and other objects, features and advantages of the present invention will become apparent from the following description, when read in conjunction with the accompanying drawings, wherein like characters of reference designate corresponding parts throughout the several views.

DETAILED DESCRIPTION OF THE INVENTION

Figure 1:
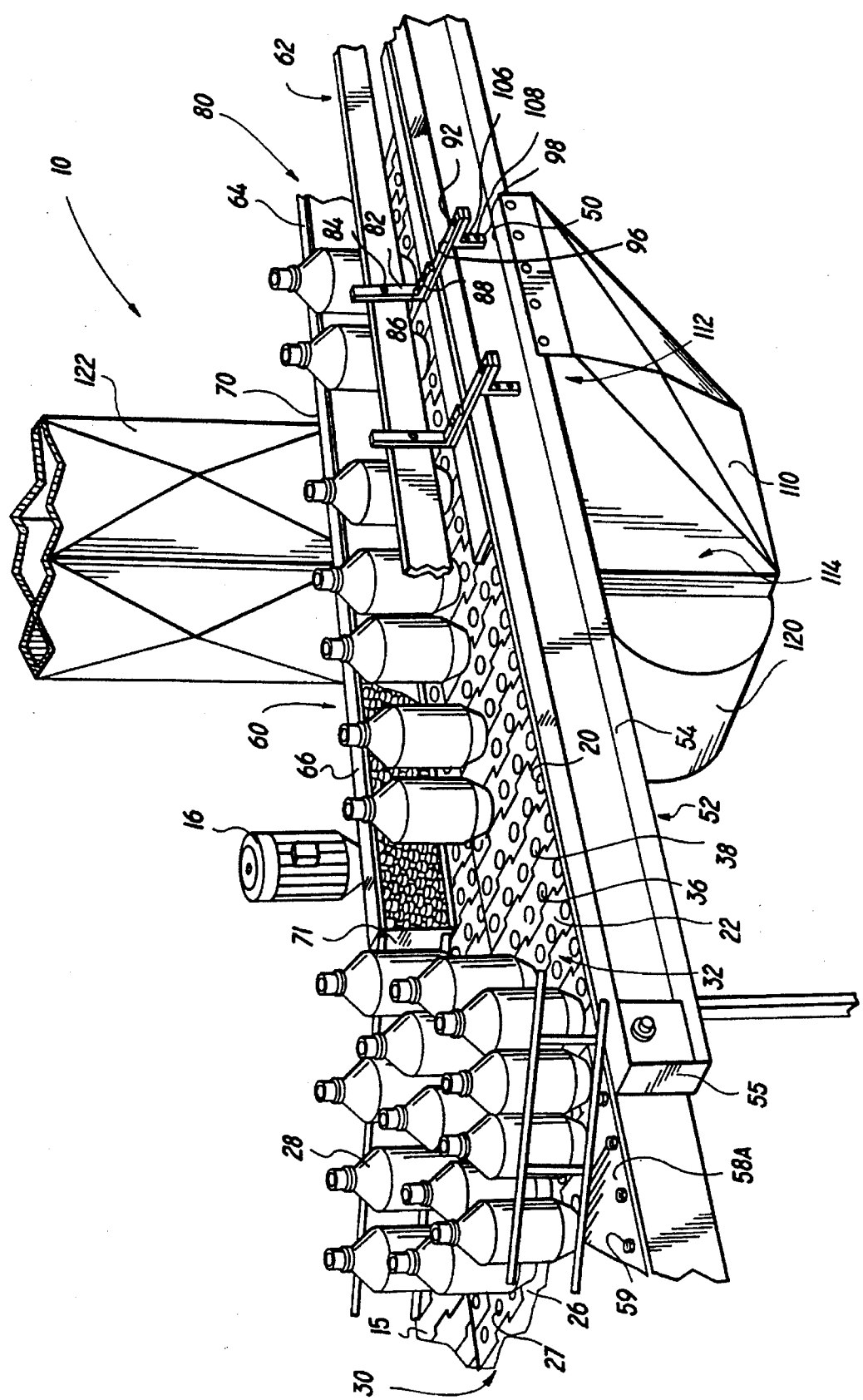
FIG. 1 is a perspective view of a preferred embodiment of the combiner.

Referring now in detail to the drawings, in which like reference numerals refer to like parts throughout the several views, a preferred embodiment of the vacuum combiner of the present invention is generally referred to as reference number 10. As best shown in FIG. 1, a plurality of lightweight containers 28 are fed into vacuum combiner 10 by standard conveyor 15, powered by standard conveyor motor 16, which conveys lightweight containers 28 to infeed conveyor 20. Infeed conveyor 20 is a Rexnord LF 4706 table-top chain conveyor manufactured by Rexnord of Grafton, Wis., U.S.A., that comprises a plurality of hinges 26. Infeed conveyor 20 has a 1½" pitch from hinge to hinge, and is six inches wide. Infeed conveyor 20 is powered by infeed conveyor motor 40 which is a Eurodrive Varimot variable speed motor manufactured by Eurodrive of Bridgeport, N.J., U.S.A. Each hinge 26 has a plurality of air flow openings 27 defined in its top surface and passing therethrough. A plurality of hinges 26 together comprise infeed conveyor surface 30.

Intermediate conveyor 22 is positioned parallel to infeed conveyor 20 such that a gap of less than 3/16" exists between the two conveyors. Intermediate conveyor 22 is connected to infeed conveyor 20 by side guides (not shown). Intermediate conveyor 22 is also a Rexnord LF 4706 table top chain conveyor that comprises a plurality of hinges 36. Intermediate conveyor 22 is powered by intermediate conveyor motor 42, which is a Eurodrive Varimot variable speed motor. Each hinge 36 has a plurality of air flow openings 38 defined therein and passing therethrough. A plurality of hinges 36 together comprise intermediate conveyor surface 32.

Figure 2:
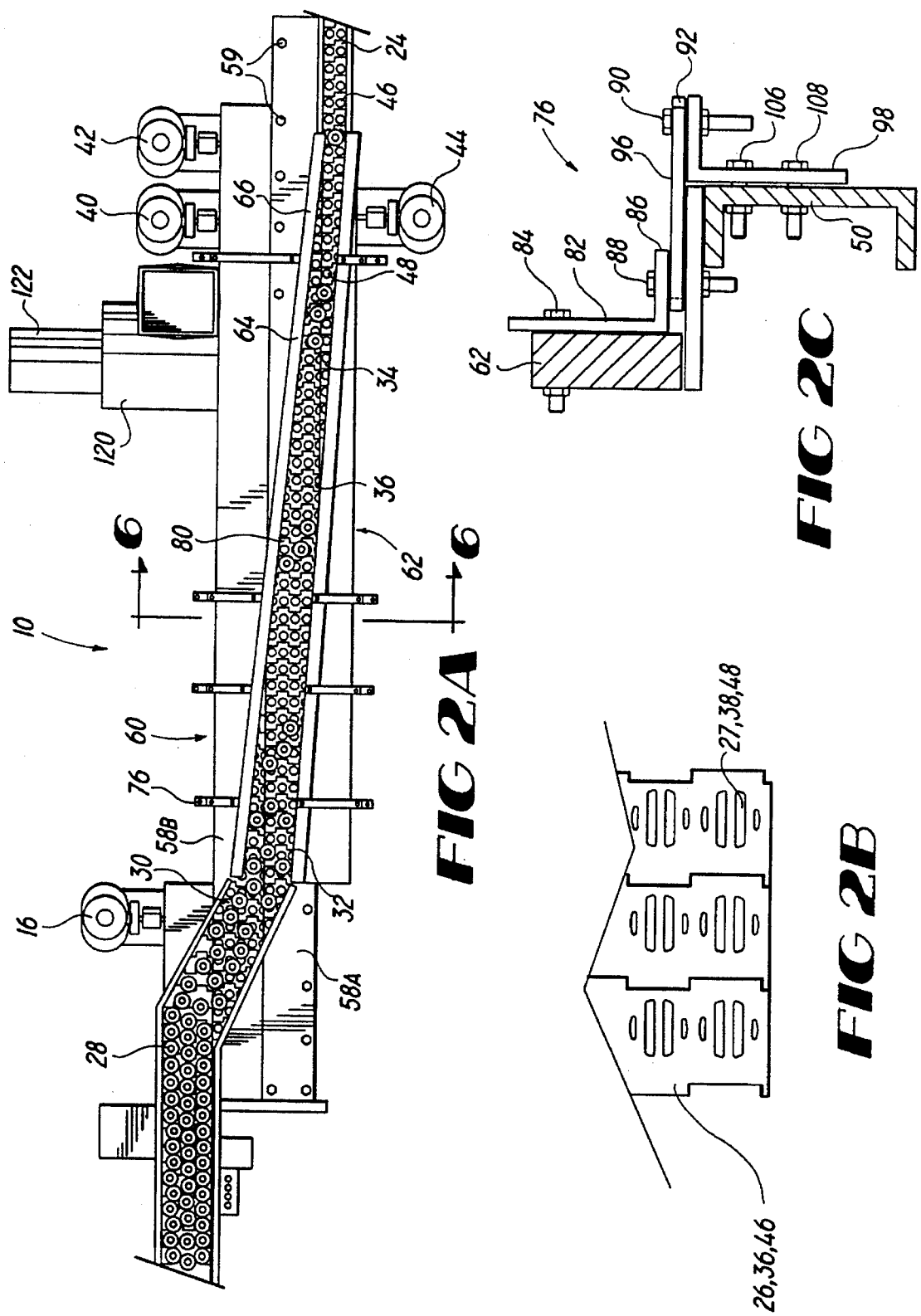
FIG. 2A is a top plan view of the combiner illustrated in FIG. 1.
FIG. 2B is a detail top plan view of a conveyor chain surface of the combiner.
FIG. 2C is a partial end view of a bracket assembly of the combiner illustrated in FIG. 1.

The embodiment of discharge conveyor 24 shown in FIG. 2A is positioned parallel to intermediate conveyor 22 such that a gap of less than 3/16" exists between the two conveyors. Discharge conveyor 24 is connected to intermediate conveyor 22 by side guides (not shown). Discharge conveyor 24 is also a Rexnord LF 4706 table top chain conveyor, is three inches wide, and comprised of a plurality of hinges 46. Discharge conveyor 24 is powered by discharge conveyor motor 44, motor 44 being a Eurodrive Varimot variable speed motor. Each hinge 46 has at least one air flow opening 48 defined therein and passing therethrough. As a plurality, hinges 46 together comprise discharge conveyor surface 34.

Figure 4:
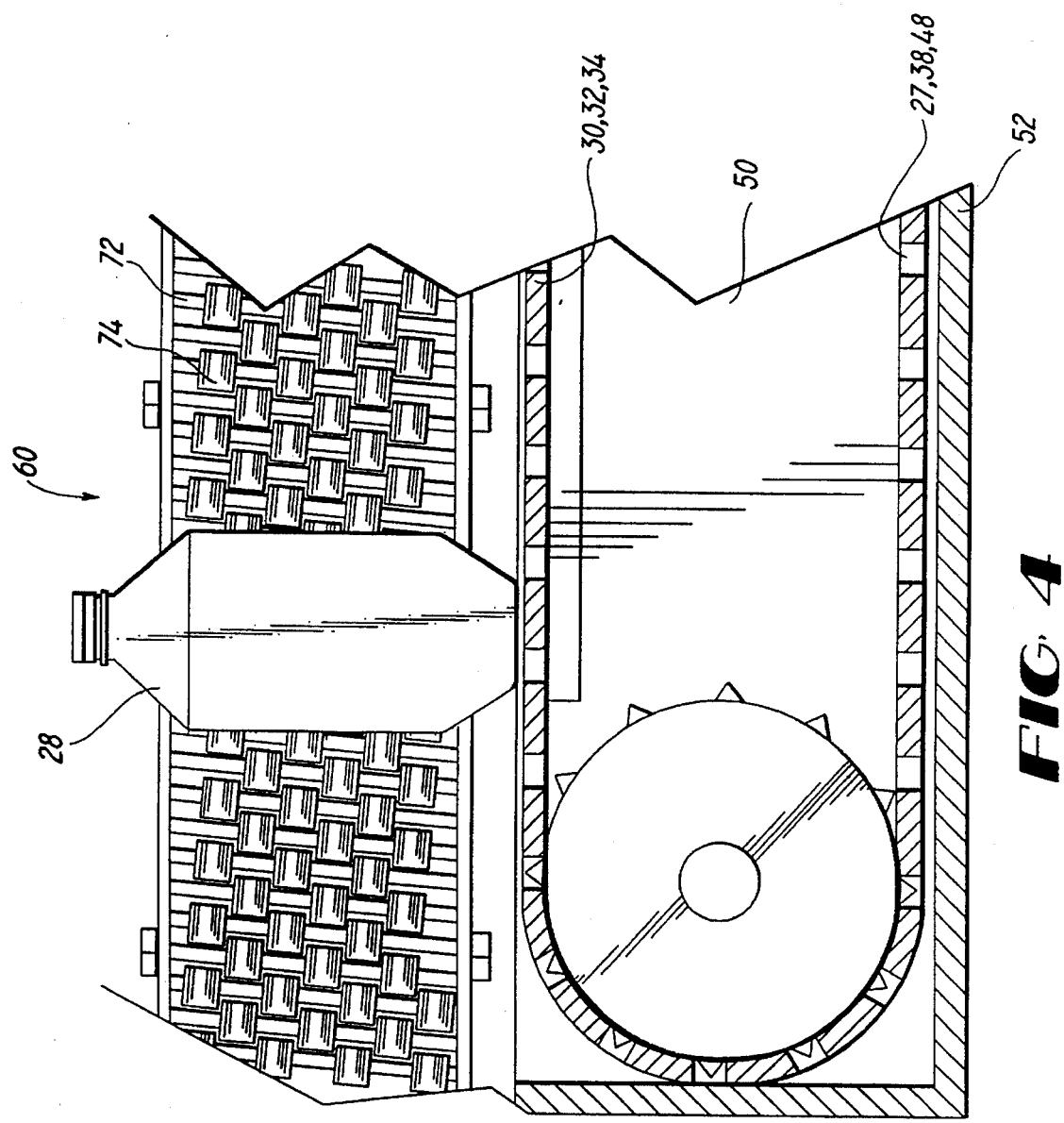
FIG. 4 is a partial side elevational view in cross-section of the air plenum, a conveyor chain, a guide rail and a container moving through the combiner of FIG. 1.

Connected to combiner 10 and supported above conveyor surfaces 30, 32 and 34 are two guide rail assemblies 60 and 62. Guide rail assemblies 60 and 62 are identical to one another, but in opposite hand. Therefore, only guide rail assembly 60 is described in detail. Guide rail assembly 60 (FIG. 1) includes a C-shaped rail housing 64 which has a housing top 66, housing bottom 68 (not shown), housing side 70, and housing ends 71a and 71b (not shown). The underside of housing top 66 and the inside of housing bottom 68 contain a plurality of corresponding apertures (not shown) defined therein. Rail assembly 60 also includes a plurality of rollers 74, and a plurality of roller rods or axles 72 (FIG. 4). Rollers 74 have concentric holes (not shown), such that they may be mounted upon, and rotated about, roller rods 72. After a number, usually three to five, rollers 74 have been mounted onto a roller rod 72, the ends of roller rod 72 are pressed into a pair of corresponding holes (not shown) defined in housing bottom 68 and housing top 66. Each roller rod 72 and rollers 74 are preferably pressed into rail housing 64 so that rollers 74 have an inclined staggered or diamond pattern, as shown in FIG. 4. Roller rod 72 may be mounted into rail housing 64 at a ninety (90) degree angle from, that is, perpendicular to, the horizontal axis, or, roller rod 72 may be mounted into rail housing 64 in inclined fashion such that the bottom end of roller rod 72 trails, or is upstream, of the top end of roller rod 72 at an angle of from three (3) to thirteen (13) degrees. By angling the top ends of roller rod 72 within the rail housing, rollers 74 direct lightweight containers 28 both downstream and downward toward the conveyor surfaces.

Guide rail assemblies 60 and 62 are supported by a plurality of bracket assemblies 76, which mount rail assemblies 60 and 62 to plenum 50, and allow the distance between rail assemblies 60 and 62, which define the width of container flow-path 80 (FIG. 1), to be adjustable. Referring to FIG. 1, each bracket assembly 76 has an L-shaped support 82 connected to rail housing side 70 by bolt 84. Referring now to FIG. 2C, the horizontal portion of support 82 has a slot 86 through which bolt 88 is passed. Bolt 88 connects first support 82 to support 96 having a slot 92 and a support bolt hole (not shown). Bolt 90 passes through the support bolt hole and connects support 96 to a second L-shaped support 98. Second support 98 has a slot 100 and holes 102 and 104 through which bolts 106 and 108 attach side support 98 to plenum side 54. As understood by those skilled in the art, the width of the container flow-path 80 may be adjusted by moving bolts 88 and 90 relative to slots 86, 92, and 100 to move rail assemblies 60 and 62 toward and away from each other, thus enabling adjustment of the container flow-path 80 for containers 28 passing therethrough.

As stated, second support 98 is attached to the sides of plenum 50. As shown in FIGS. 1 and 2A, plenum 50 has a pair of opposed sides 54 and 56 (not shown), together with plenum bottom 52, plenum top portions 58a and 58b, and plenum ends 55 and 57. Plenum 50 is a generally closed rectangular-shaped box. The top of plenum 50 is in part defined by conveyor surfaces 30, 32, and 34, and in part by plenum top portions 58a and 58b, as shown in FIG. 2A. Top portions 58a and 58b are reciprocally aligned about the container flow-path 80 defined by rail assemblies 60 and 62. Plenum top portions 58a and 58b are each connected to plenum ends 55 and 57 by a plurality of bolts 59. Plenum top portions 58a and 58b are also held in place by the vacuum pressure generated within plenum 50, drawing ambient air through air flow openings 27, 38, 48 defined in the respective conveyor surfaces. In an alternative embodiment, plenum top portions 58a and 58b may be bearing plates or strips positioned below the conveyor surfaces and connected to the sides of plenum 50.

Plenum ends 55 and 57 are constructed so that they will surround and at least partially encompass conveyors 20, 22, and 24. In particular, plenum end 57, which allows discharge conveyor 24 to pass therethrough, must be fit as snugly as possible to discharge conveyor 24 to minimize air loss.

Plenum bottom 52 has a section removed therefrom so that duct member 110 (FIG. may be attached thereto to allow air to flow through plenum bottom 52 and into duct member 110. Duct member 110 is bolted to plenum side walls 54 and 56.

Figure 3:
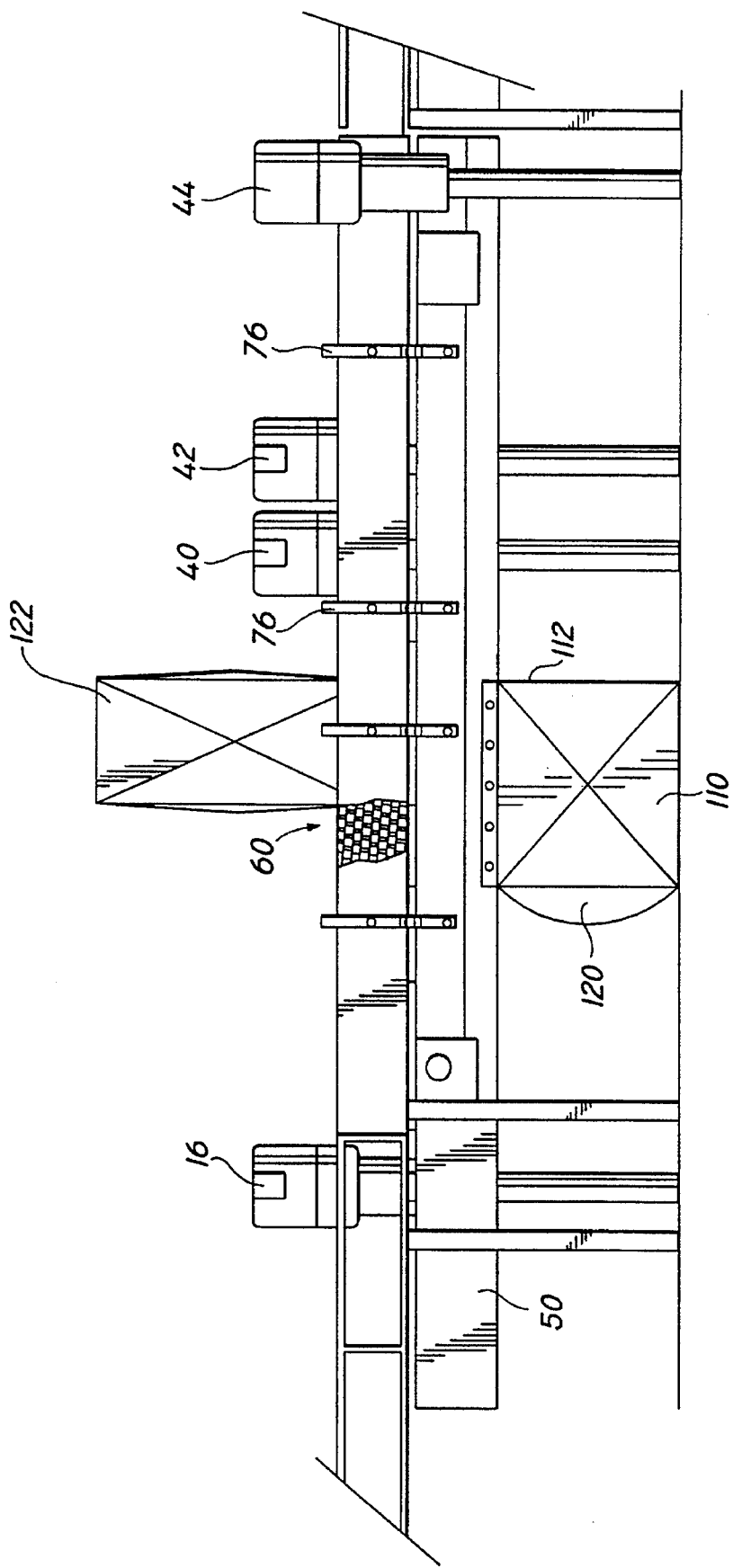
FIG. 3 is a side elevational view of the combiner with a portion cut away to show a side rail assembly.

As shown in FIGS. 1 and 3, in addition to a side wall 112, duct member 110 also has a blower wall 114. Blower wall 114 is attached to vacuum source, or blower, 120. Vacuum source 120 is a Dayton blower, Model number 7H171, adapted to pull air through air flow openings 27, 38, and 48 into plenum 50, through plenum bottom 52, into duct member 110, through duct member 110, and into vacuum source 120. Vacuum source 120 then expels the air drawn into the plenum through discharge duct 122.

In alternative embodiments, the surface conveyor belts of the present invention may be any standard oval shaped table-top chain conveyor. The width of the conveyor surfaces may range from three inches to one foot. At least 10% of the conveyor surfaces should be open, however.

Each individual conveyor should be powered by a conventional variable speed motor. Although it is anticipated the motors are variable speed motors, it is preferable to operate the motors at a predetermined fixed speed. All of the motors together may be set such that each conveyor surface will be moving at the approximate rate of 300 feet per minute (fpm), or roughly 3.4 mph. However, the motor speeds may be set such that discharge conveyor surface 34 is running fastest, at approximately 600 fpm, and infeed conveyor 20 slowest, at approximately 50 fpm. Once the conveyors are aligned parallel to one another by the side guides on the sides of the conveyor assembly of combiner 10, it is anticipated that no more than a 1/8 inch gap will be present between the adjacent and parallel conveyors 20, 22 and 24.

The entire length of the vacuum combiner may be as short as six feet, and because the downstream end, or discharge end, of combiner 10 may be placed in direct contact with a single-file dependent machine, i.e., a workstation supplied by a single container width conveyor belt, for example discharge conveyor 24, or discharge conveyor 143, (FIG. 7), the present invention greatly reduces the amount of space required to combine containers 28 and integrate the combiner with the next workstation.

Guide rail assemblies 60 and 62 are adjustable so that the width of the container flow-path 80 may be varied and that lightweight containers 28 of varying width may be combined. Guide rails assemblies 60 and 62 must be positioned over the conveyor surfaces such that a pair of converging guide rails define container flow-path 80 which is progressively narrowed to the width of a single container 28. Although the infeed width of the guide rails is not essential, the guide rails should be tapered from the infeed width to their single file discharge width at an angle of from 1 degree to 5 degrees, preferably 3 degrees, for a standard 12 oz. plastic bottle.

The guide rail assemblies, as described above, comprise an assembly of several mini-rollers mounted on a plurality of vertical rods supported in a housing. It is understood by those knowledgeable in the art that the roller rods 72 and rollers 74 are mounted in the guide rail assemblies so that they form a staggered pattern of intersecting freely rotatable rollers, thus providing an almost frictionless guide rail assembly that provides a smooth, relatively vibration-free guiding and merging of the containers, as opposed to a guide means with larger or unstaggered rollers.

Each individual mini-roller 74 is preferably made of a low-friction acetal plastic. A preferred embodiment of mini-roller 74 is cylindrical, with a 7/16 inch diameter, and is 1/4 inch thick. Such a mini-roller will be constructed of "Delrin" from DuPont.

The preferred embodiment of rod 72 is a 5/32 inch diameter steel rod. The assembled rods 72 that support rollers 74 are mounted at their ends into holes formed in the top and bottom walls of the sheet metal housing 64 of rail assemblies 60 and 62. Preferably, each guide rod 72 should be angled with the bottom end of the rod trailing the top end of the rod, inclined at an angle of from five(5) to ten(10) degrees from the vertical axis of rods 72 such that rollers 74 mounted on the rod will force containers 28 being conveyed by the combiner down toward the conveyor surfaces. In addition, each guide rail can be angled inward and downward over the conveyor surfaces at an angle of from zero (0) to forty (40) degrees from vertical so that the guide rails will also force containers 28 being conveyed by combiner 10 down toward the conveyor surfaces of the combiner.

Figure 5:
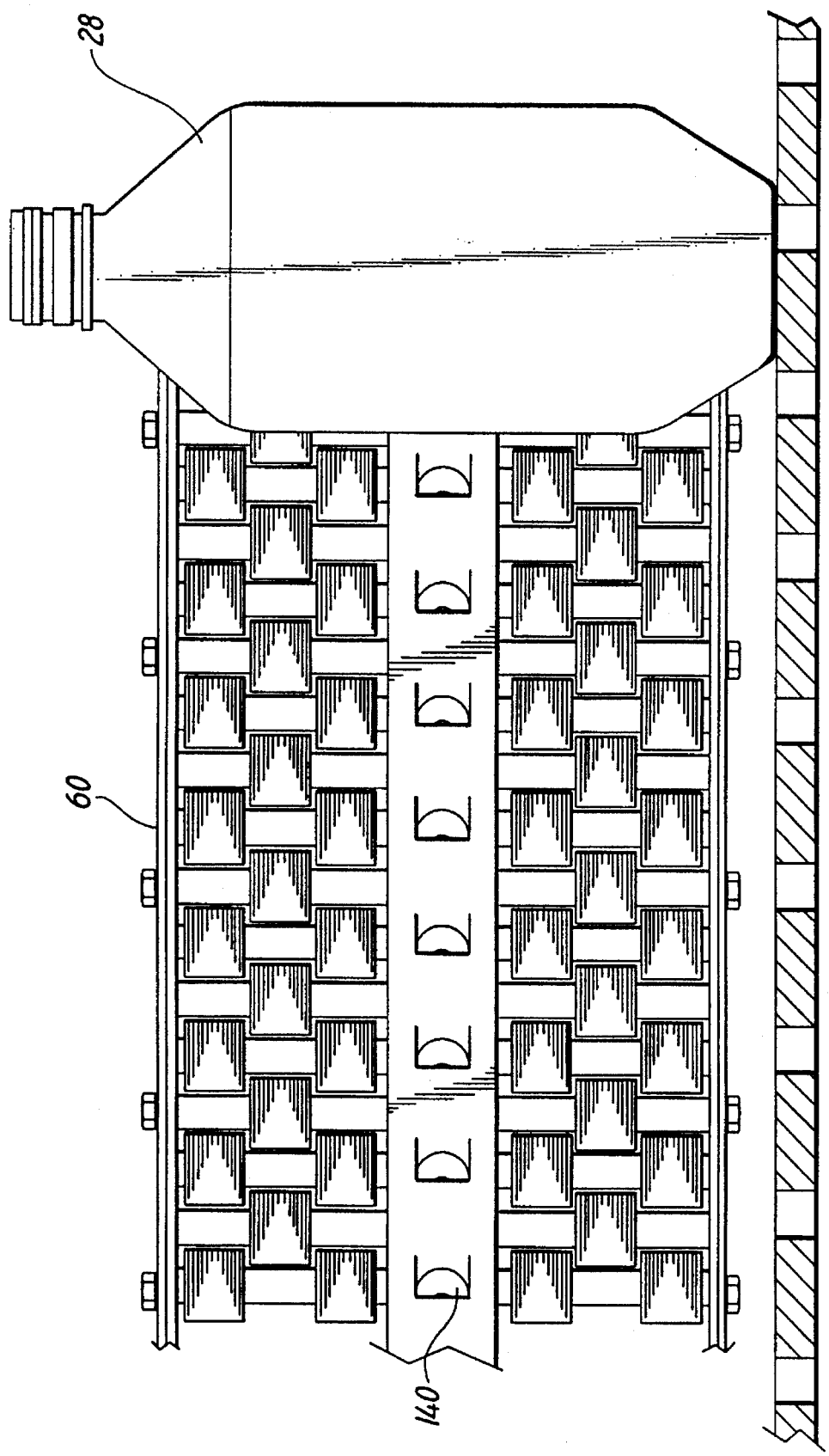
FIG. 5 is a side view of an alternate guide rail including air jets.
Figure 6:
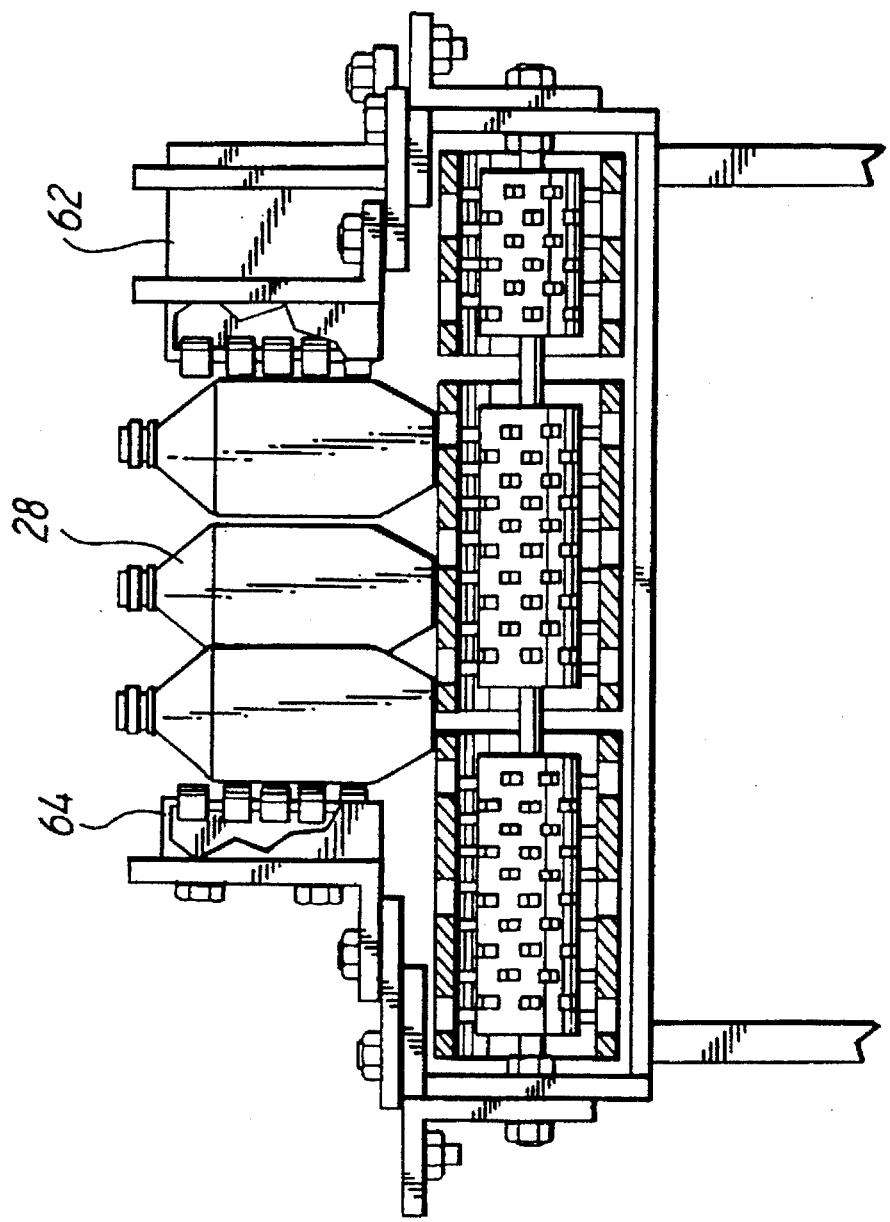
FIG. 6 is a cross section along line 6—6 of FIG. 2A.

In an alternate embodiment of the present invention, illustrated in FIG. 5, an air jet guide system comprised of individual air jets 140 may also be incorporated into guide rail assemblies 60 and 62. Streams or jets of air are directed from each of air jets 140 across the container flow path 80 to gently urge containers 28 into a single file of containers.

The vacuum combiner of the present invention may also incorporate the use of one or more vacuum sources to draw air through the openings in the conveyor chains. One vacuum source may provide sufficient vacuum force for all of the conveyors. However, in an alternate embodiment, an independent vacuum source and plenum for each conveyor will be provided.

Each vacuum source is preferably a blower that runs at a constant speed, and the inlet of the blower communicates with a duct and plenum which applies the low pressure to the lower surface of the flight of the conveyor chain which moves the containers. As a result, air is pulled through the air flow openings 27, 38, 48 defined in the conveyor surfaces by the blower, and is discharged through discharge duct 122. The suction or vacuum force is only applied to the part of the conveyor surface that is between the guide rails 60 and 62, which is defined as the container flow-path 80. For those portions of the conveyor that are not intended to be in the container flow-path, the conveyor surface should be solid, without any air flow openings to prevent depletion of the vacuum force in plenum 50. Generally, the amount of vacuum applied to the particular conveyor surface is varied by controlling the speed of the blower, the constriction of the conduit extending between the blower and the conveyor, and by varying the amount of surface area, that is, the air flow openings in the conveyor surfaces, open to the vacuum source on a particular conveyor.

In a preferred embodiment, the amount of vacuum force applied to infeed conveyor 20 of the combiner is less than the vacuum applied to the subsequent conveyors, usually at a suction force that approximately doubles the effective weight of the container. The next parallel conveyor in the container flow-path has a vacuum greater than the infeed conveyor vacuum, of approximately two to five times the container weight. The discharge conveyor 24 should have the greatest vacuum force which should be such that it increases the containers' weight by approximately five times. If more than three parallel conveyors are used, it should be appreciated that the progressive vacuum strength from infeed to discharge should be maintained. It is also anticipated that the amount of vacuum or suction pressure exerted on the conveyors may vary so that the vacuum level on containers 28 through air flow openings 27, 38 and 48 will increase along the length of each conveyor surface as the conveyor belt moves in a downstream direction. This would be accompanied by providing variable speed vacuum blowers; by the design and construction of the plenum, for example, the plenum having a progressively smaller cross section in the direction of the conveyor surface's movement for increasing air velocity drawn through the air flow openings into the plenum and thus vacuum levels; and/or by the placement of the blower toward the downstream end of the conveyor so that air flow velocity and flow rates are greater at the downstream end of the conveyor(s). The vacuum pressure on containers 28 will also be substantially uniform across the surface width of conveyors 20, 22 and 24, while the vacuum pressure thus increases in the direction of the conveyor belts' movement.

The preferred blower of the present invention is Dayton blower, Model No. 7H171, a five horsepower blower that has a 18¼" diameter fan wheel. It is anticipated that the blower will be run at a constant speed resulting in 6100 cubic feet of air being moved per minute, at three inches of static pressure. Therefore, when the vacuum combiner of the present invention only uses one blower, and its duct member is placed closer to the discharge end of the combiner, that discharge end of each conveyor surface will have the greatest vacuum force, due to the location of the duct and the blower with respect to the surface conveyors, and also because the discharge conveyor of the vacuum combiner has the least amount of surface area.

Turning now to FIGS. 7 to 10, an alternate preferred embodiment of a free standing vacuum surface discharge conveyor 143, which need not be aligned parallel to and adjacent any one of the conveyors of combiner 10, is shown. In this embodiment, discharge conveyor 143 will be used not only to receive and move containers 28 from combiner 10, but is also adapted to receive containers 28 from combiner 10, as well as from any other container handling device or workstation along the production line (not shown), and to move the containers toward, and between, subsequent workstations (not shown) along the production line. Due to the realization of heretofore unexpected production rates attained by combiner 10, a separate vacuum surface discharge conveyor such as that shown in FIGS. 7 to 10 is desirable for moving combined containers 28 along the production line so that production rates further down the production line will not be slowed by the inability to move containers away from the combiner for further processing at the increased rates of container movement through combiner 10.

Figure 7:
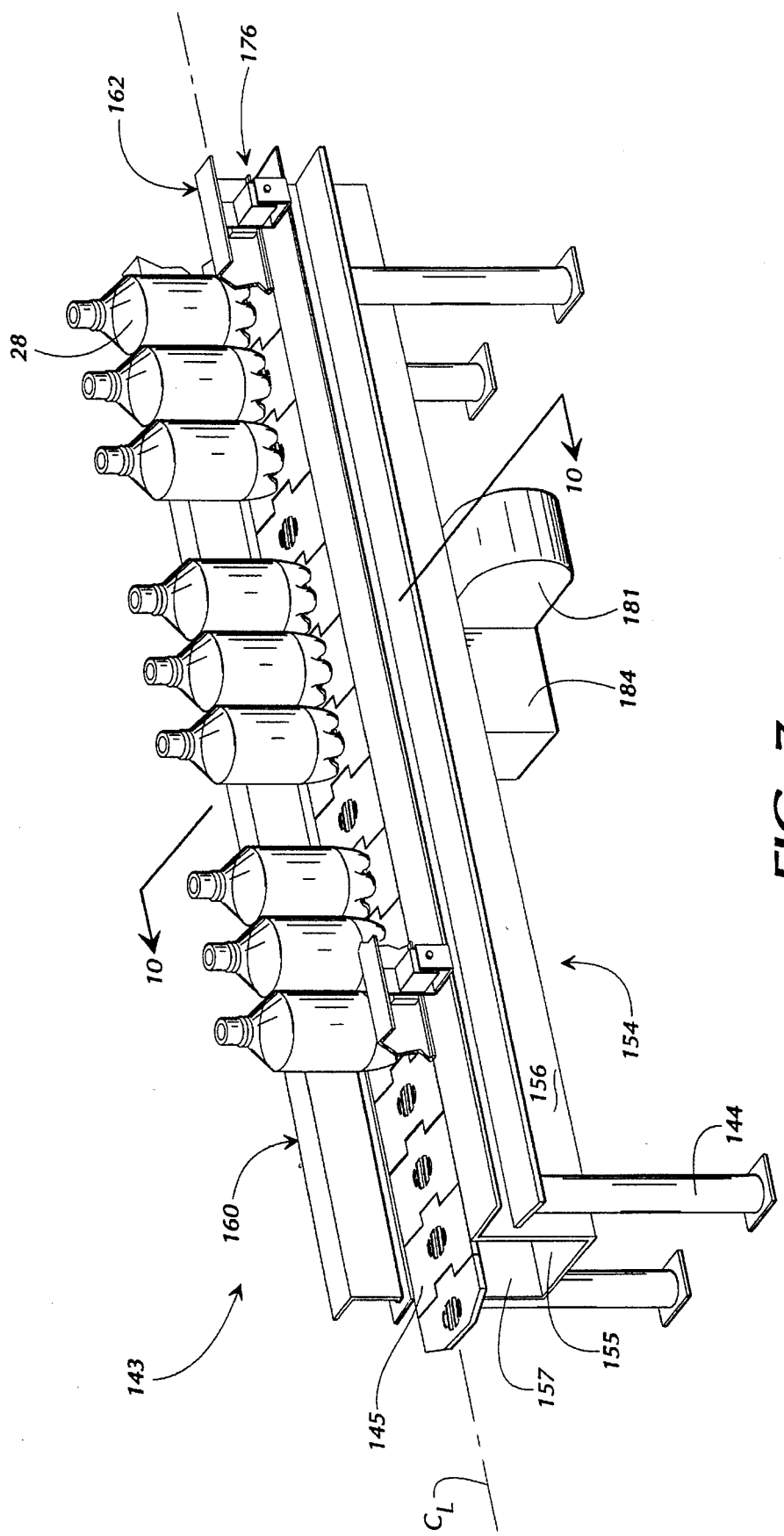
FIG. 7 is a perspective illustration of an alternate preferred embodiment of the discharge conveyor.

Referring now to FIG. 7, vacuum discharge conveyor 143 is illustrated. Vacuum discharge conveyor 143 includes a framework 144 for supporting the discharge conveyor, and a discharge conveyor surface 145 formed from a plurality of hinges 147.

Figure 8:
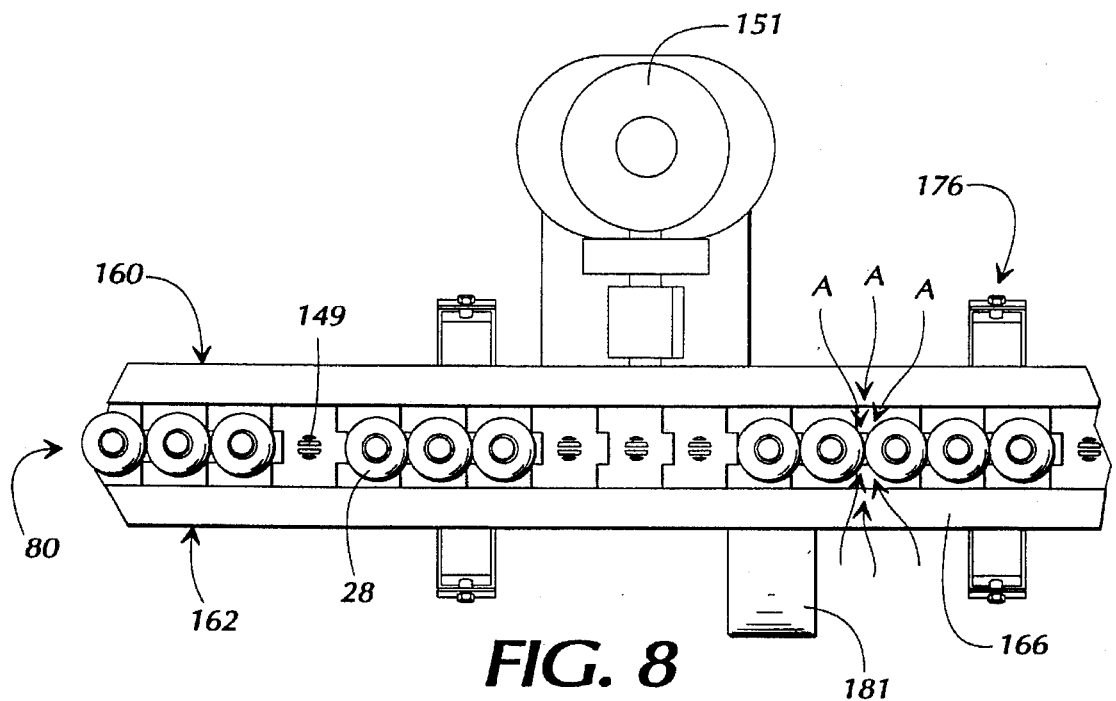
FIG. 8 is a top plan view of the discharge conveyor of FIG. 7.
Figure 9:
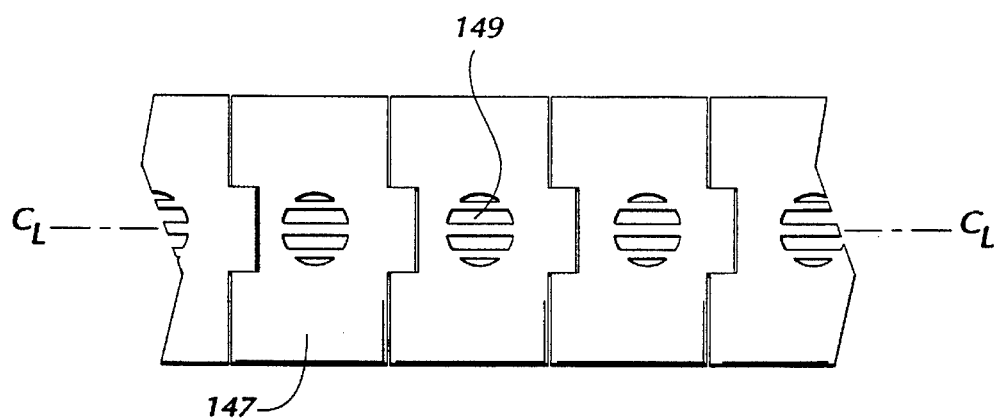
FIG. 9 is a detail top plan partial view of the surface of the discharge conveyor of FIG. 7.

Referring briefly to FIG. 9, each of hinges 147 has a plurality of slotted air flow openings 149 defined therein and passing therethrough so that air may be drawn through air flow openings 149 and through discharge conveyor surface 145. As is shown in both FIGS. 7 and 9, air flow openings 149 are aligned along the longitudinal axis of, and extend along the length of, discharge conveyor surface 145. Each of hinges 147 is pivotally attached to each adjacent hinge 147, it being understood by those skilled in the art that discharge conveyor surface 145 is thus formed as a table top chain conveyor. As with discharge conveyor 24, discharge conveyor 143 may be a Rexnord LF 4706 table top chain conveyor having a width of three inches. As shown in FIG. 8, discharge conveyor 143 is powered by discharge conveyor motor 151, motor 151 being a Eurodrive Varimot variable speed drive motor. Discharge conveyor motor 151 powers discharge conveyor 143 in conventional fashion, and is thus not described nor illustrated in greater detail herein.

Figure 10:
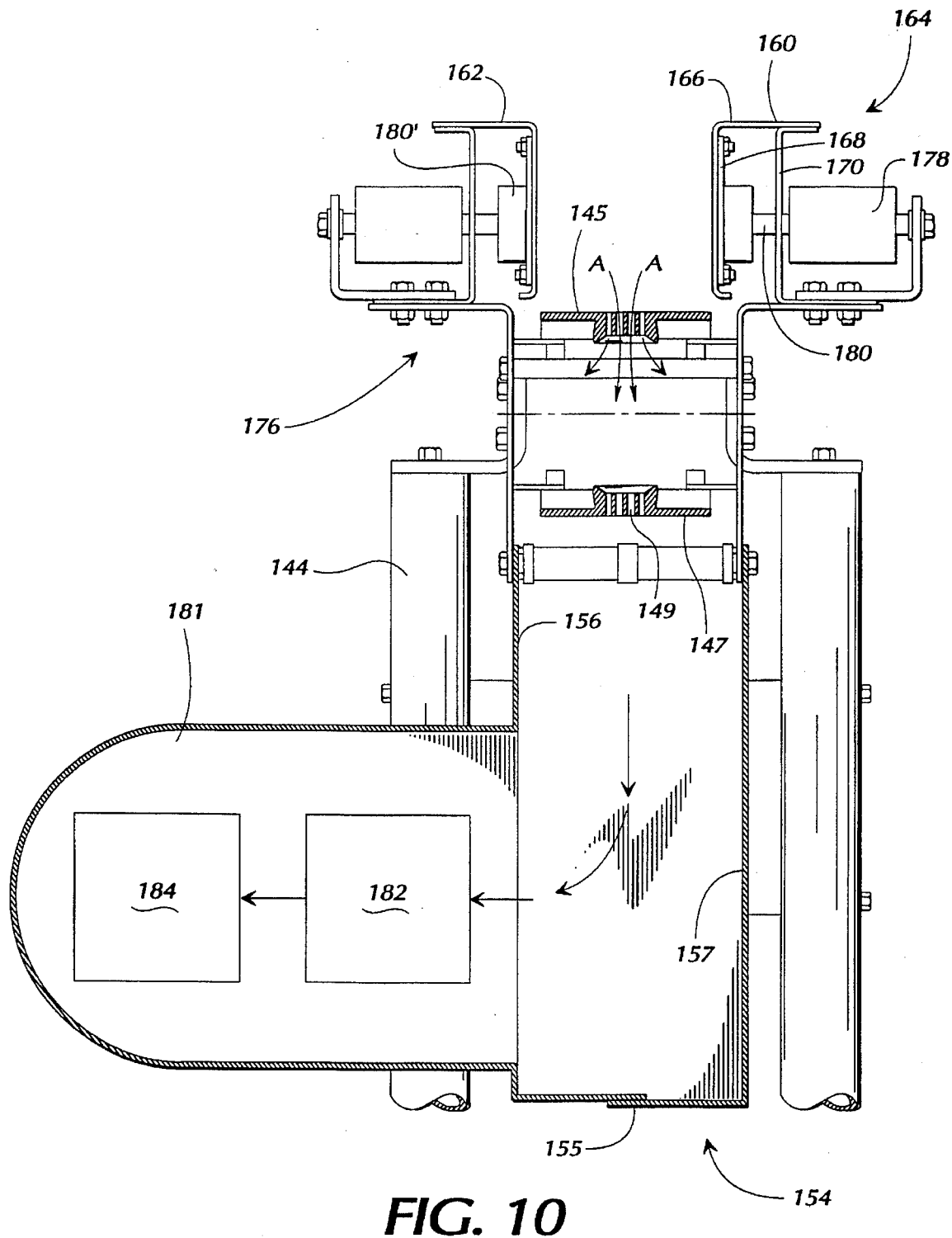
FIG. 10 is a cross sectional view of the discharge conveyor along line 10—10 of FIG. 8.

Turning now to FIGS. 7 and 10, framework 144 also supports plenum 154. Plenum 154 is formed as a generally closed or rectangular box extending along the length of discharge conveyor 143, plenum 154 being in sealed fluid communication with each of air flow openings 149 defined in discharge conveyor surface 145. As best shown in FIG. 10, plenum 154 has a bottom wall 155, and opposed side walls 156 and 157. The top of plenum 154 is in actuality discharge conveyor surface 145, thus forming the generally closed rectangular and elongated box which is plenum 154.

As shown in FIGS. 7, 8, and 10, discharge conveyor 143 has a pair of opposed guide rail assemblies 160 and 162 which extend along the length of the discharge conveyor. Guide rail assemblies 160 and 162 of the discharge conveyor are supported above discharge conveyor surface 145, and are adjustable so that they may be moved toward and away from each other for guiding light weight containers 28 of varying widths. Thus constructed, guide rail assemblies 160 and 162 can either widen or narrow container flow path 80 (FIG. 8).

Turning now to FIG. 10, each of guide rail assembly 160 and 162 has a generally rectangular housing 164 extending along the length of the discharge conveyor 143. Housing 164 is comprised of housing top 166, and a pair of spaced apart housing sides 168 and 170, each of housing sides 168 and 170 being fastened to housing top 166 along their top edges. As shown in FIG. 10, housing side 168 is bent at an approximate 90 degree angle so that it forms housing top 166, while housing side 170 is also bent at its top edge at an approximate 90 degree angle so that the outward edge of housing top 166 is formed of double thickness for additional strength and rigidity. In addition, housing side 170 is fastened to, and forms a part of, guide rail bracket assemblies 176, as illustrated in FIGS. 7, 8, and 10.

Guide rail bracket assemblies 176 are formed in conventional fashion, and are thus not described in greater detail herein. It is anticipated, however, that bracket assemblies 176 can be constructed in a fashion similar to bracket assembly 76 for combiner 10, as shown in FIGS. 1 and 2C. In addition to housing 164 for each of the guide rail assemblies, each guide rail assembly also includes a plurality of pneumatic cylinders 178 supported on bracket assembly 176, each pneumatic cylinder having a rod 180 extending through an opening (not illustrated) defined in housing side 170, and extending therethrough to a surface pad 180 fastened to the rear surface of housing side 168, so that when pneumatic cylinder 178 is actuated, rod 180 is moved toward and away from the longitudinal center line or axis of discharge conveyor surface 145 (FIGS. 7 and 9) for varying the width of container flow path 80.

It is anticipated that containers 28 will be held by air pressure along the longitudinal center line of discharge conveyor surface 145 so that the containers do not engage the surfaces of rail assemblies 160 and 162, thus having the desired effect of increasing the speed at which containers 28 will be moved along discharge conveyor 143 toward subsequent workstations (not illustrated) along the production line (not illustrated).

Referring now to FIGS. 7 and 10, a blower housing 181 is formed as a part of plenum 154. Blower housing 181 houses a blower or vacuum source 182, indicated in FIG. 10, and an exhaust or discharge duct 184 in sealed fluid communication with blower housing 181 and plenum 154, so that the vacuum level created by blower 182 and plenum 154 in conjunction with air flow openings 149 is not otherwise diminished or reduced. Blower/vacuum source 182 will be a variable velocity vacuum fan operated by a variable speed electric motor (not illustrated) so that its speed, and thus the air velocity, can be increased or decreased, thus increasing or decreasing the vacuum level present within plenum 154.

As shown in FIG. 10, air is drawn through discharge conveyor surface 145 by being drawn through air flow openings 149 in hinges 147, as indicated by the arrows marked with the letter "A". The air is then drawn into the body of plenum 154 and toward blower housing 181. After being drawn into blower housing 181, the air is exhausted from plenum 154 through discharge duct 184 to the atmosphere. Although not illustrated, it is anticipated that discharge duct 184 will extend to the exterior of the building or facility in which discharge conveyor 143 is being used so as not to otherwise create undesired air flows capable of moving dirt and debris within the production facility.

OPERATION

In the embodiment of the combiner and discharge conveyor shown in FIGS. 1 through 6, in operation blower, or vacuum source, 120 is continually pulling air through air flow openings 27, 38, and 48 defined in conveyor surfaces 30, 32, and 34, to create a vacuum force on containers 28. As a lightweight container 28 on infeed conveyor surface 30 passes over the portion of the infeed conveyor surface 30 that comprises a portion of the plenum top, the lightweight container will be "weighted" or pulled down by the air being sucked through air flow opening 26 by blower 120. Because blower 120 and duct member 110 are positioned closer to the discharge conveyor surface 34, and because the width of the container pathway 80 is greatest at each the point of entry for each container 28 on the combiner, the amount of drag, or vacuum suction, on the container is lowest at this point. As infeed conveyor surface 30 continues to convey lightweight container 28 downstream, the container will be urged onto parallel intermediate conveyor surface 32 by guide rail assembly 60 and also by the greater drag force that is created by the flow of air through air flow openings 38. The drag force that is created by the flow of air through air flow openings 38 is greater than the amount of drag force created by the flow of air through air flow openings 27 on infeed conveyor surface 30 because the width of the container pathway 80 is narrowing, and also because the intermediate conveyor surface 32 is closer to blower 120 and duct member 110 than is infeed conveyor surface 30. Moreover, and as described above, the vacuum suction or drag force on each of conveyor surfaces 30 and 32 may be increased as the containers move downstream on the conveyors.

As intermediate conveyor surface 32 continues to convey lightweight container 28 downstream, the width of the container pathway 80 continues to narrow in at least a three degree angle, which is determined by the distance between guide rail assemblies 60 and 62. Lightweight containers 28 will eventually be urged by guide rail assembly 60 onto discharge conveyor surface 34, as shown in the embodiment illustrated in FIGS. 1 and 2. Discharge conveyor surface 34 has the greatest amount of drag force being pulled through its air flow openings 48 because discharge conveyor surface 34 has the narrowest container pathway 80 and is closest to the point at which plenum bottom 52 attaches to duct member 110 and blower 120. It is also anticipated, however, that discharge conveyor 24 may be equipped with its own plenum, separate from combiner 10's plenum 50, as illustrated in FIGS. 7 and 10. Because the amount of drag force created by the flow of air through air flow openings 48 on conveyor surface 34 is greater than the drag force applied to containers 28 when the containers are on intermediate conveyor surface 32, lightweight containers 28 will be pulled from intermediate conveyor surface 32 onto discharge conveyor 34. The amount of drag force applied to containers 28 on discharge conveyor surface 34 should have the effect of increasing the weight of containers 28 by approximately 500%.

As shown in FIG. 2A, while lightweight containers 28 are on discharge conveyor surface 34, the width of container pathway 80 quickly narrows to a width only slightly greater than the diameter of container 28 being conveyed thereon. Because containers 28 are now in a single file, the containers may be fed directly by discharge conveyor 24 into an appropriate apparatus for further processing. As shown in FIG. 2A, containers 28 are urged by guide rail assemblies sideways off of intermediate conveyor 22 and onto discharge conveyor 34. However, it is also possible that for the embodiment of discharge conveyor 34 shown in FIGS. 7 to 10, the discharge conveyor would be fed containers 28 by intermediate conveyor 22, or its equivalent, in an end to end relationship where the ends of the conveyors are positioned adjacent each other, for example.

Although the invention has been described as merging a multiple width arrangement of containers into a single row of containers, it will be understood that the term "containers" is used to describe duplicate articles of manufacture and should not be limited to only cans or bottles. It will also be understood that this invention is particularly suited for irregularly shaped container bottoms upon which it is normally difficult to form a vacuum seal.

An alternate embodiment of discharge conveyor 24 is illustrated in FIGS. 7–10. Discharge conveyor 143 functions in the same manner as discharge conveyor 24, discharge conveyor 143 being constructed differently in that each of hinges 147 comprising discharge conveyor surface 145 has a single series of slotted air flow openings 149 defined therein and extending along the central (longitudinal) axis of discharge conveyor surface 145, rather than having air flow openings 48 defined across the width and length of the discharge conveyor, as in discharge conveyor surface 34. In addition, although discharge conveyor 143 is shown in FIGS. 7 as a free standing vacuum conveyor line, the discharge conveyor of FIG. 7 can also be used in lieu of discharge conveyor 24 shown in conjunction with combiner 10, as illustrated in FIGS. 1 and 2A.

Returning now to FIG. 7, after containers 28 have been combined on combiner 10, containers 28 are passed onto discharge conveyor surface 145. This can be accomplished in at least two manners. The first of which would be to transfer the containers laterally onto discharge conveyor surface 145 in the same construction of combiner 10 where the containers are transferred laterally onto discharge conveyor surface 34 (FIGS. 1, 2A), or discharge conveyor 143 can be placed at the downstream or delivery end of combiner 10 to receive containers 28 after they have combined into a single file of containers being passed from the combiner. Again, this can be done on a lateral transfer basis, or it can be accomplished through an arrangement where discharge conveyor 143 abuts the last of the conveyors comprising combiner 10. It is anticipated, however, that discharge conveyor 143 will be placed in a parallel and aligned position with intermediate conveyor surface 32 of combiner 10 for receiving containers 28 passed therefrom.

A unique feature of the discharge conveyor illustrated in FIG. 7, however, is the manner in which it acts to group bottles together along the center line or longitudinal axis of discharge conveyor surface 145, illustrated best in FIGS. 7 and 8.

As illustrated in FIG. 10, air is drawn through air flow openings 149 in the hinges 147 which make up discharge conveyor surface 145. As constructed, discharge conveyor 143 will draw air only along the longitudinal center line of the conveyor, thus air will tend to move from the sides of each hinge 147 adjacent guide rail assemblies 160 and 162, respectively, toward an air flow opening 149. In addition, once containers 28 have been transferred onto discharge conveyor surface 145, the vacuum or weighting force drawn through air flow openings 149 will also have to pass around and underneath each of containers 28. This is schematically illustrated in FIG. 8 by air flow arrows A. The effect of this will be to create a venturi effect air flow between each of adjacent containers 28 as they are carried along discharge conveyor surface 145. Due to the vacuum levels present in discharge conveyor 143, which could be higher than those present in combiner 10, the amount of drag force created by the flow of air through air flow openings 149 will not only weight the bottles on discharge conveyor surface 145, but will have the effect of drawing each of the containers closer together due to the low pressure being created between each of adjacent containers 28 situated on discharge conveyor surface 145. This will result in a plurality of groups of a single file line of containers 28 being carried along the longitudinal center line of discharge conveyor 143 (FIG. 8). This has the desired effect of not only weighting containers 28 for increased transport rates along discharge conveyor 143, but also helps to ensure that each of containers 28 is situated on the center of discharge conveyor surface 145, with less likelihood of coming into a speed slowing contact with the plurality of rollers 174 which together form a part of guide rail assemblies 160 and 162, discussed in greater detail above. Accordingly, it is possible to obtain higher pass through rates with a discharge conveyor such as that illustrated in 143, than it would be with conventional discharge conveyors known in the art.

An additional feature of the construction of discharge conveyor 143 is that it will help to ensure that the production rate of combiner 10 can be utilized to full effect in that containers 28 will not become bottled up or bridged further down the processing line by the inability to move containers 28 away from combiner 10 as quickly as combiner 10 is able to combine and pass them down along the processing line. As discharge conveyor 143, as well as discharge conveyor 34, are moving at a faster rate of speed relative to combiner 10, it is not anticipated that each of containers 28 will be positioned adjacent other containers along the entire length of discharge conveyor 143, but rather that groups of containers 28 will be present, as illustrated in FIGS. 7 and 8. However, based upon the production rates of combiner 10, and the velocity with which discharge conveyor surface 145 is moved, it is possible that containers 28 can form a continuous line of adjacent containers 28 centered along the longitudinal center line of discharge conveyor surface 145.

The heretofore unachieved lightweight container combiner speeds of the present invention are illustrated by the following examples, which are not intended to be limiting.

EXAMPLES

The following data was obtained using the preferred embodiment of the present invention. More specifically, rods 72 housed in guide rail assemblies 60 and 62 were slanted forward, toward the downstream end of combiner 10, as described above, one vacuum source was applied as depicted in FIG. 2A, and discharge conveyor 24 was operated at its greatest speed. As a control, containers 28 were combined without vacuum.

| Container | BPM Without Vacuum | BPM With Vacuum |
| --- | --- | --- |
| 1. 12 oz. Plastic bottle | 600 | 1200 |
| 2. 20 Oz. Plastic bottle | 700 | 1000 |
| 3. 1 Liter Plastic bottle | 500 | 800 |

Although the foregoing data illustrates examples of heretofore unachieved combiner rates for the above-listed containers, it will be obvious that other lightweight containers, as described herein, can also be combined at heretofore unknown rates.

In addition, although the foregoing invention has been described by way of illustration and example for purposes of clarity and understanding, it will be apparent to those skilled in the art that numerous changes or modifications may be made thereto without departure from the spirit and scope of the invention, as claimed hereinafter.

We claim:

1. A process for combining a randomly arranged plurality of containers into a narrower stream of containers as the containers are moved along a processing path and thereafter transporting the containers to a downstream workstation, comprising the steps of:

operating a first surface conveyor and a second laterally adjacent and parallel surface conveyor at progressively greater effective surface speeds with respect to each other;

delivering the containers in a randomly arranged mass to an upstream end of said first surface conveyor;

guiding the containers through a progressively constricted path laterally across said first and said second surface conveyors from the slower operating first surface conveyor to the faster operating second surface conveyor;

applying a substantially uniform level of vacuum across the width of said first and said second surface conveyors from beneath the surfaces of each of said surface conveyor to the containers moving across said surface conveyors, and increasing the vacuum level from said first surface conveyor to said second surface conveyor;

operating a discharge surface conveyor at a progressively greater effective surface speed than the effective surface speed of the second surface conveyor;

applying a substantially uniform level of vacuum to the containers moving along said discharge conveyor from beneath the surface of said discharge conveyor, wherein said level of vacuum is greater than the level of vacuum applied to said second surface conveyor; and guiding the containers from said second surface conveyor toward said discharge conveyor;

whereby the second surface conveyor with an amount of vacuum greater than the first surface conveyor tends to pull the containers off of the first surface conveyor and onto the second surface conveyor, and the discharge surface conveyor with an amount of vacuum greater than the second surface conveyor tends to pull the containers off of the second surface conveyor and onto the discharge conveyor to transport the containers to the workstation.

2. The method of claim 1, further comprising the step of increasing the level of vacuum on said first and said second surface conveyors along the length of each conveyor, respectively, as said conveyors move downstream.

3. The method of claim 1, further comprising the step of increasing the level of vacuum on said discharge surface conveyor along the length thereof as said discharge surface conveyor moves downstream.

4. A process for combining a randomly arranged plurality of containers into a narrower stream of containers as the containers are moved along a processing path and transporting the containers to a downstream workstation, comprising the steps of:

operating a first surface conveyor and a second laterally adjacent and parallel surface conveyor at progressively greater effective surface speeds with respect to each other;

delivering the containers in a randomly arranged mass to an upstream end of said first surface conveyor;

guiding the containers through a progressively constricted path laterally across said first and said second surface conveyors from the slower operating first surface conveyor to the faster operating second surface conveyor;

applying a substantially uniform level of vacuum across the width of said first and said second surface conveyors from beneath the surfaces thereof to the containers moving across said conveyors, and increasing the vacuum level from said first conveyor to said second conveyor;

operating a discharge surface conveyor at a progressively greater effective surface speed than the effective surface speed of the second surface conveyor;

applying a substantially uniform level of vacuum to the containers moving along said discharge conveyor from beneath the surface of said discharge conveyor, wherein said level of vacuum is greater than the level of vacuum applied from beneath said second surface conveyor;

guiding the containers from said second surface conveyor toward said discharge conveyor; and grouping a plurality of containers adjacent one another as the containers are transported on said discharge conveyor;

whereby the second surface conveyor with an amount of vacuum greater than the first surface conveyor tends to pull the containers off of the first surface conveyor and onto the second surface conveyor, and the discharge conveyor with an amount of vacuum greater than the second surface conveyor tends to pull the containers off of the second surface conveyor and onto the discharge conveyor to transport the combined containers to the workstation.

5. The method of claim 4, further comprising the step of grouping the containers adjacent one another in a line along a longitudinal axis of the discharge surface conveyor.

6. The method of claim 5, further comprising the step of grouping the containers into a plurality of spaced groups of containers along the length of the discharge surface conveyor.

7. An apparatus for combining a randomly arranged plurality of containers into a narrower stream of containers as the containers are moved along a processing path, and for thereafter transporting the containers to a downstream workstation, comprising:

means for operating a first surface conveyor and a second laterally adjacent and parallel surface conveyor at progressively greater effective surface speeds with respect to each other;

means for delivering the containers in a randomly arranged mass of containers to an upstream end of said first surface conveyor;

means for guiding the containers through a progressively constricted path laterally across said first and said second surface conveyors from the slower operating first surface conveyor to the faster operating second surface conveyor;

means for applying a substantially uniform level of vacuum across the width of said first and said second surface conveyors from beneath the surface of each of said surface conveyor to the containers moving across each of said surface conveyors respectively, wherein the vacuum level is increased from said first surface conveyor to said second surface conveyor;

means for operating a discharge surface conveyor at a progressively greater effective surface speed than the effective surface speed of the second surface conveyor;

means for applying a level of vacuum along the length of said discharge surface conveyor from beneath said discharge surface conveyor to the containers being moved thereon, wherein the level of vacuum applied to the discharge surface conveyor is greater than the level of vacuum applied to the second surface conveyor; and means for guiding the containers from said second surface conveyor toward said discharge surface conveyor;

whereby the containers are guided onto the second surface conveyor from the first surface conveyor, the containers being combined into a narrower stream of containers on the second surface conveyor, whereupon the containers are guided onto the discharge surface conveyor to be transported toward the workstation.

8. The apparatus of claim 7, wherein said means for applying a substantially uniform level of vacuum across the width of said first and said second surface conveyors includes a plurality of air flow openings defined across the width, and along the length, of the surface of said surface conveyors and passing therethrough, said air flow openings being in fluid communication with a plenum formed beneath said surface conveyors, and means for drawing air through said air flow openings and into said plenum.

9. An apparatus for combining a randomly arranged plurality of containers into a narrower stream of containers as the containers are moved along a processing path, and for thereafter transporting the containers to a downstream workstation, comprising:

means for operating a first surface conveyor and a second laterally adjacent and parallel surface conveyor at progressively greater effective surface speeds with respect to each other;

means for delivering the containers in a randomly arranged mass of containers to an upstream end of said first surface conveyor;

means for guiding the containers through a progressively constricted path laterally across said first and said second surface conveyors from the slower operating first surface conveyor to the faster operating second surface conveyor;

means for applying a substantially uniform level of vacuum across the width of said first and said second surface conveyors, respectively, from beneath the surface of each said surface conveyor to the containers moving across each of said surface conveyor, wherein the vacuum level is increased from said first surface conveyor to said second surface conveyor;

means for operating a discharge surface conveyor at a progressively greater effective surface speed than the effective surface speed of the second surface conveyor;

means for applying a level of vacuum along the length of said discharge conveyor from beneath the surface of said discharge conveyor to the containers being moved thereon, wherein the level of vacuum applied to the discharge conveyor is greater than the level of vacuum applied to the second surface conveyor;

means for guiding the containers from said second surface conveyor toward said discharge conveyor; and means for increasing the level of vacuum along the length of said first conveyor and said second conveyor as said conveyors are moved downstream;

whereby the containers are guided onto the second surface conveyor from the first surface conveyor, the containers being combined into a narrower stream of containers on the second surface conveyor, whereupon the containers are guided onto the discharge conveyor to be transported to the workstation.

10. The apparatus of claim 7, wherein said means for applying a level of vacuum along the length of said discharge surface conveyor comprises a plurality of air flow openings defined centrally with respect to the width of, and along the length of the discharge surface conveyor and passing therethrough, said air flow openings being in fluid communication with a plenum formed beneath and extending along at least a portion of the length of the discharge surface conveyor, and means for drawing an air flow through said air flow openings and into said plenum.

11. The apparatus of claim 7, wherein said apparatus further comprises means for increasing the level of vacuum along the length of said discharge surface conveyor as said conveyor moves downstream toward the workstation.

12. The apparatus of claim 7, wherein said means for guiding the containers through a progressively constricted path laterally across said first and said second surface conveyors, and said means for guiding the containers from said second surface conveyor toward said discharge surface conveyor, comprise at least two spaced apart guide rail assemblies supported above the surfaces of said conveyors, said guide rail assemblies being adapted to converge toward each other along the length of said first and said second surface conveyors.

* * * * *